Nov. 3, 1925.
N. O. KNUTSON
1,560,262
SHOCKER ATTACHMENT FOR HARVESTER BINDERS
Filed Aug. 21, 1920    5 Sheets-Sheet 5
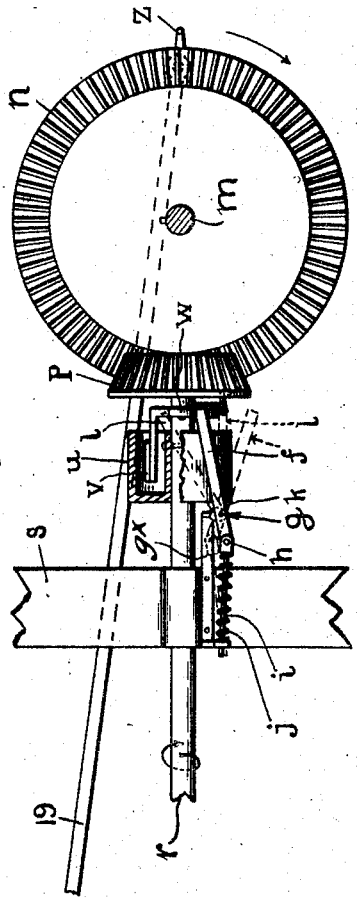
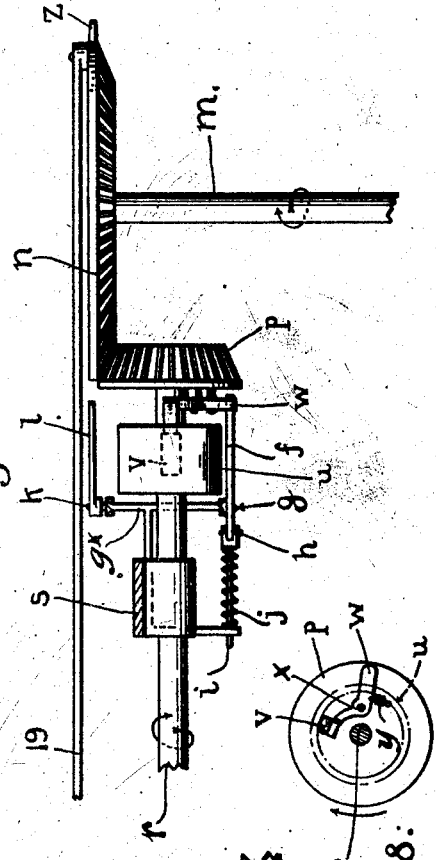
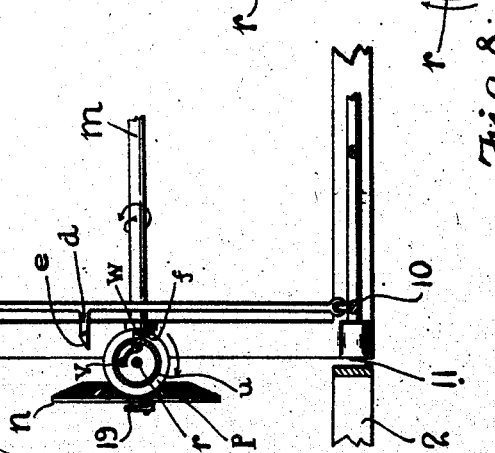
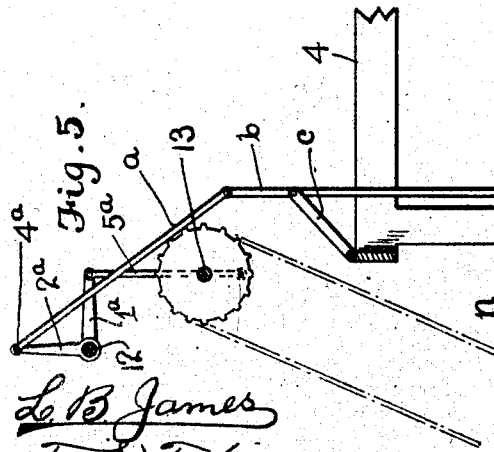
N. O. Knutson
INVENTOR
BY Victor J. Evans
ATTORNEY Patented Nov. 3, 1925.

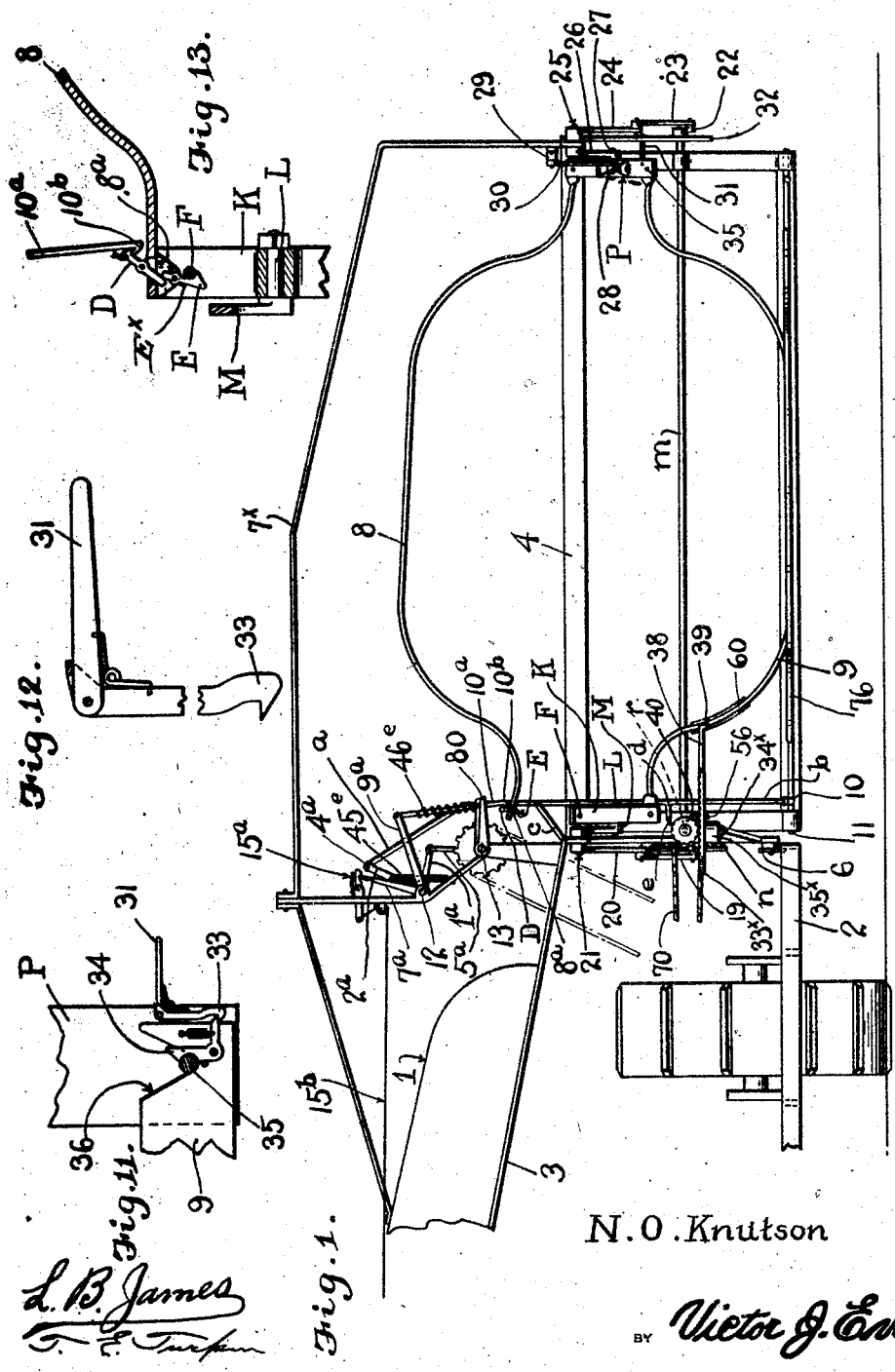

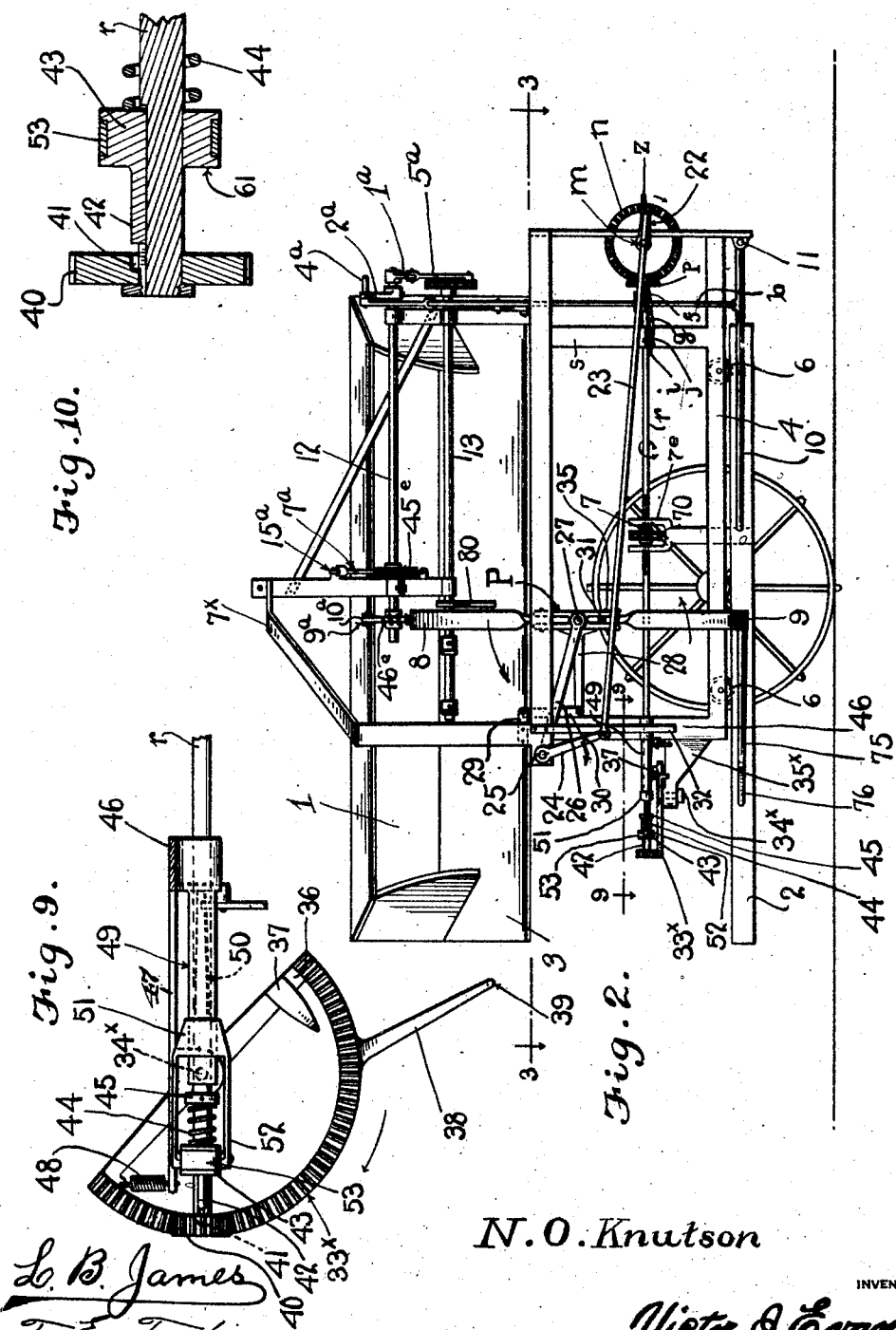

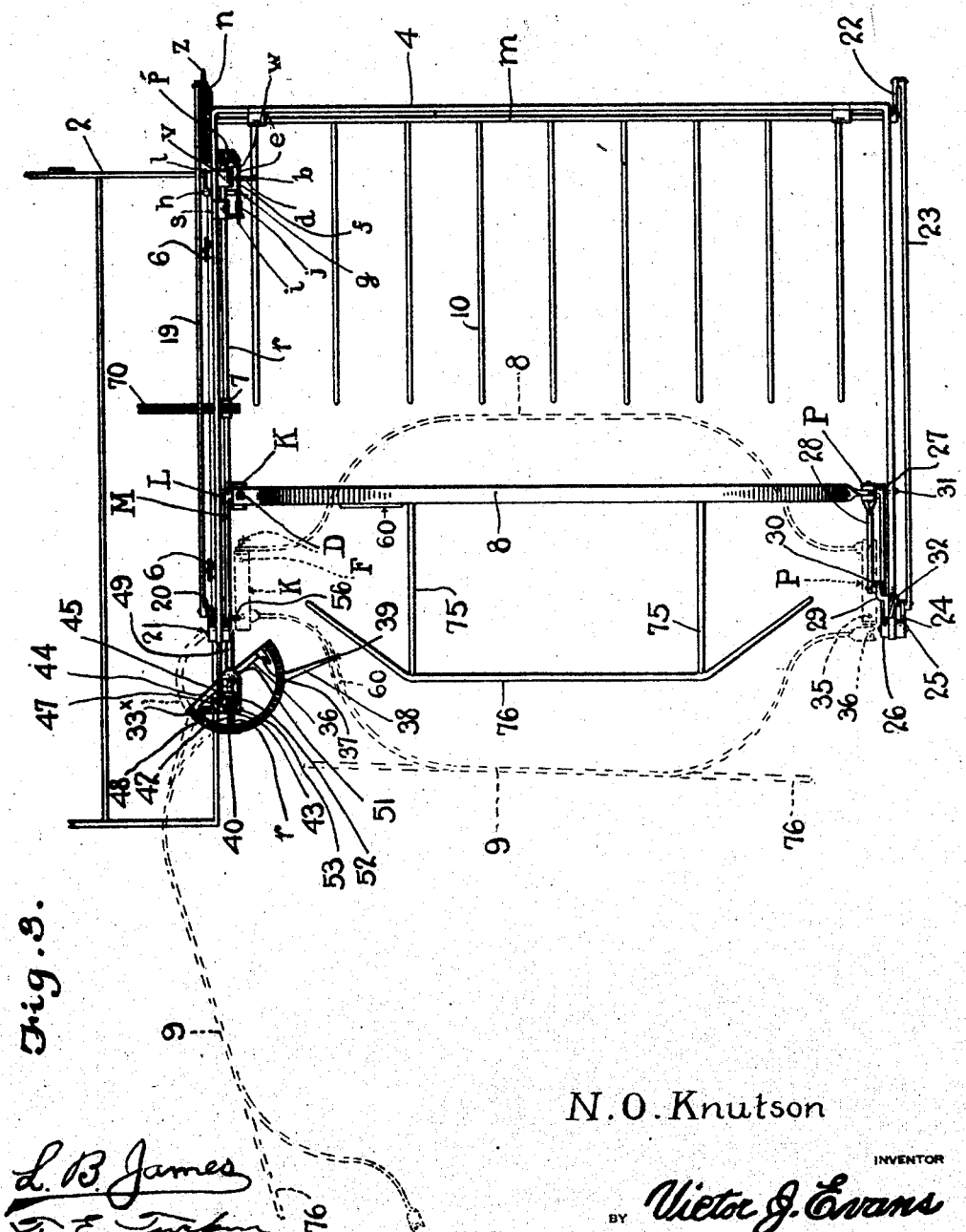

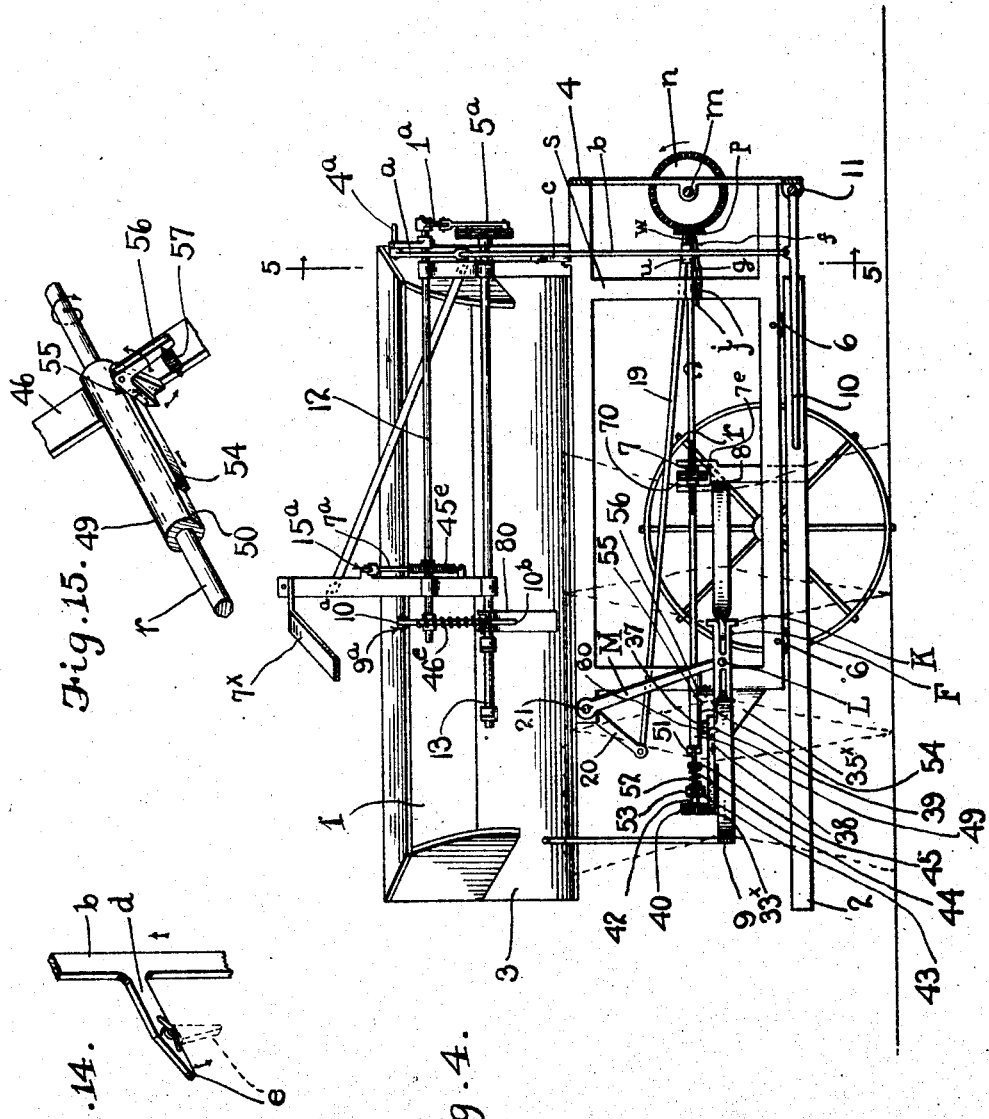

1,560,262

UNITED STATES PATENT OFFICE.

NATHANIEL O. KNUTSON, OF BERWICK, NORTH DAKOTA.

SHOCKER ATTACHMENT FOR HARVESTER BINDERS.

Application filed August 21, 1920. Serial No. 405,051.

*To all whom it may concern:*

Be it known that I, NATHANIEL O. KNUTSON, a citizen of the United States, residing at Berwick, in the county of McHenry and State of North Dakota, have invented new and useful Improvements in Shocker Attachments for Harvester Binders, of which the following is a specification.

My present invention has for its object the provision of a shocker attachment for harvester binders embodying an inexpensive and reliable organized mechanism for shocking bundles of grain and depositing the shocks on end on the ground during the traverse of the machine, and one that is well adapted to withstand the shocks and jars and a general rough usage to which binder mechanism is ordinarily subjected.

This invention is applicable to any type of harvester and binder utilizing a bundle delivery chute, and in the present disclosure the mechanism involving this invention is adjustably attached to a well known harvester and binder in such position that a plurality of bundles (preferably twelve bundles) can be collected from the delivery chute of the harvester binder and disposed in a perpendicular position prior to final delivery on the ground.

The mechanism comprising this invention, particularly the elements for embracing the plurality of bundles to be deposited on the ground, is primarily manipulated by the ordinary needle shaft of the binder through the instrumentality of power transmitting means, the same being initially set in motion, after a plurality of bundles have been collected, by a manually controlled trigger.

The binder alluded to by applicant is of the ordinary type and ties and discharges the bundles in the ordinary well known manner. The shocker attachment is used in association with an ordinary well known binder.

To the attainment of the foregoing the invention consists in the improvement as hereinafter described and definitely claimed.

In the accompanying drawings, hereby made a part hereof:—

Figure 1 is a rear elevation showing the application of my improvement to a harvester binder such as disclosed in Letters-Patent No. 712,409 of Oct. 28, 1902, and also showing the compressing arm as open.

Figure 2 is a side elevation of the attachment.

Figure 3 is a view taken on the line 3—3 of Figure 2, looking downwardly.

Figure 4 is a side elevation of the attachment with parts in dumping position.

Figure 5 is a detail sectional view of the tripping means of the downwardly moving member.

Figure 6 is an enlarged sectional view of the trip mechanism of the said downwardly swinging means, said view being taken at right angles to Figure 5.

Figure 7 is a plan view of the said tripping mechanism.

Figure 8 is a detail view of the clutch comprised in said tripping mechanism.

Figure 9 is an enlarged plan view of the release mechanism for the releasing arm; said view being taken in the plane indicated by the line 9—9 of Figure 2, looking downwardly.

Figure 11 is a side elevation of the locking mechanism for the other end of the releasing arm.

Figure 12 is a view of the trip lever comprised in said locking mechanism.

Figure 13 is a detail view of the locking mechanism for the inner end of the compressing arm.

Figure 14 is a detail perspective of the trip for the downwardly swinging means.

Figure 15 is a detail inverted sectional perspective of the trip comprised in the mechanism shown in Figure 9.

Similar numerals and letters of reference designate corresponding parts in all of the views of the drawings.

In ordinary harvesters and binders, the procedure of adjusting the bundle tying mechanism around the shock is in common practice and, in order to facilitate efficient operation of the mechanism comprising my invention regardless of the position of the tying mechanism, my shocker is adjustably attached to the delivery end of the binder so that the various elements will function without independent adjustment. This will be better understood when it is stated that the bundle chute 1 and the frame portion 2 are fixed with respect to the frame of the harvester binder, and that the board 3 and the shocker attachment frame 4 and the parts carried thereby including the longitudinal shaft $r$ are adjustable lengthwise relatively to the harvester binder; the frame 4 being provided with wheels 6 that are adapted to travel on the frame portion 2. The drive gear 7 is feathered or splined on the shaft $r$ so that the said shaft $r$ can be adjusted longitudinally through the gear 7 without changing the location of the said gear 7. The said gear 7 is mounted in and held against lateral movement by an arm $7^e$ fixed to the frame portion 2. The outer portion of the shocker attachment frame 4 is supported by the overhanging means $7^x$ from the harvester binder board 3 as best shown in Figure 1.

Among other elements my shocker attachment includes a bundle compressing arm 8, a bundle releasing arm 9, a downwardly swinging member 10, the center of movement of which is indicated by 11, and a longitudinal shaft 12 adjustable longitudinally with the board 3 and the frame 4. The said shaft 12 is provided with an arm $1^a$ that is fixed thereon, and is also provided with an arm $2^a$ that is loose on the shaft and is provided with a forward projection $4^a$. The arm $1^a$ is moved to the projection $4^a$ of arm $2^a$ as each bundle is discharged from the harvester binder; it being understood in this connection that the arm $1^a$ is connected through a link $5^a$ with a crank on the shaft 13 of the harvester binder. Also, fixed on the shaft 12 are arms $7^a$ and $9^a$. At $15^a$ is a catch for the arm $7^a$, and it will be noted in this connection that a manually operable cable $15^b$ is connected to the said catch $15^a$ for the release of the same by an attendant. In Figure 1 the shocker is open due to the position of the inner end of the compressing arm 8. This opening of the shocker is brought about by the action of the arm $1^a$ against the projection $4^a$ of the arm $2^a$, Figure 2, and it will be noted that the catch $15^a$ will engage and hold the arm $7^a$. This will be better understood when it is stated that element $1^a$ only contacts with the projection $4^a$ of the arm $2^a$ when said arm $2^a$ is lowered and while in the position shown in Figure 1, element $1^a$ simply oscillates approximately to the position occupied by projection $4^a$ as the catch $15^a$ retains arm $2^a$ in elevated position approximately at the termination of the upward stroke of the element $1^a$. The arm $9^a$ operates when swung upwardly and inwardly to raise a rod $10^a$ and the inner end of the compressing arm 8; the rod $10^a$ being provided at its lower end with a hook $10^b$, and the compressing arm 8 having a lug $8^a$ and being equipped with lever hooks D and E, as best shown in Figure 13; the heel of the lever hook D being arranged in lapped relation to the lever hook E which latter is spring actuated, and said lever hook E being adapted to engage a pin F in a swinging head K. The spring that actuates the hook E is lettered $E^x$. The said head K is pivotally mounted on a journal L carried by an arm M hereinafter described in detail. On the upward movement of the rod $10^a$ the lever hook D is swung, and the lever hook E is disengaged from the pin F with the result that the compressing arm 8 is released from the head K. Attention is directed to the fact that when the catch $15^a$ releases the arm $7^a$, the spring $46^e$ pulls rod $10^a$ downwardly while spring $45^e$ likewise pulls arm $7^a$ and, since the extremity of rod $10^a$ lies over the adjacent portion of arm 8, the force of these two springs $45^e$ and $46^e$, in a common direction, will push the arm 8 in latched relation with element K. The hook $10^b$ of rod $10^a$ disengages from hook D as it travels toward the arm 8 under the influence of springs $45^e$ and $46^e$ and is allowed to return to normal position without interference with the hook D on account of the fact that arm 8 and the associated elements assume a horizontal position out of the path of the rod $10^a$. At this time the arm $2^a$ swings downwardly and operates to trip the mechanism as best shown in Figures 5 to 8. This will be better understood when it is stated that the arm $2^a$ is connected by a link $a$ with a vertically movable rod $b$, held in position by a link $c$. On the rod $b$ is an arm $d$, Figures 5 and 14, and the said arm $d$ carries a spring-pressed tappet $e$, adapted to flex downardly and be held against flexing upwardly as appears in dotted lines and in full lines in Figure 14. It will also be noticed by reference to Figure 5 that the rod $b$ is hingedly connected at its lower end to the downwardly swinging member 10. The tappet $e$ is adapted on the downward movement of the rod $b$ to depress one arm of the lever $f$, fulcrumed at $g$ on a frame bracket $g^x$, Fig. 6 and having its other arm pivotally connected at $h$ to a rod $i$ that is yieldingly pressed by a spring $j$ toward the right in Figure 6, in order to yieldingly retain the lever $f$ in the positions shown by full lines and dotted lines in Figure 6. At the fulcrum $g$ is a rock shaft $k$ to which the lever $f$ is fixed, and fixed to the said rock shaft $k$ at a point remote from the lever $f$ is a swinging arm $l$. By reference to Figure 3 it will be noticed that the frame of the attachment carries a shaft $m$ that is disposed laterally to the harvester binder.

On the shaft $m$ is fixed a miter gear $n$, and intermeshed with the said miter gear $n$ is a miter gear $p$ that is loose on a shaft $r$, arranged at right angles to the shaft $m$. The shaft $r$ is journaled on a frame portion $s$ in close proximity to the lever $f$, and fixed on the shaft $r$ is a friction drum $u$, opposed to the inner surface of which is a friction shoe $v$ on one arm of a lever $w$, which lever $w$ is fulcrumed at $x$ on the back of the gear $p$, Fig. 8 and is subject to the action of a retractile spring $y$ interposed between its arm and the back of the gear $p$. When the tappet $e$ moves downwardly after engaging the lever $f$, it moves said lever $f$ out of the path of the outer arm of the lever $w$ which permits the spring $y$ to move the shoe $v$ into engagement with the drum $u$, Figs 5 and 8. This locks the drum $u$ to the gear $p$ with the result that the gear $p$ will rotate with the shaft $r$ and the gear $n$ and the shaft $m$ will be turned through a part of a revolution. This has the effect of swinging the compressing arm 8 and the releasing arm 9 to a horizontal position—i. e., a position at right angles to that shown in Figure 1 so as to stand the shock on end on the ground. It will be noticed by comparison of Figures 6 and 7 that the gear $n$ is provided with a radial projection $z$. The said radial projection $z$ is adapted to engage the arm $l$ and moves said arm $l$ outwardly. This rocks the shaft $k$ in reverse direction with the result that the lever $f$ is raised or returned to the position shown by full lines in Figure 6, when, as will be readily understood, the lever $f$ will be in the path of the outer arm of the lever $w$ so as to retract the shoe $v$ from engagement with the drum $u$ and thereby render the gear $p$ loose on the shaft $r$. This last named operation takes place while the compressing arm 8 and the releasing arm 9 are arranged in the same horizontal plane. Connected to the gear $n$ at a point off the center thereof is a rod 19. At a point remote from the gear $n$ the said rod 19 is connected to a lever 20, Figure 4, said lever 20 being fixed to a rock shaft 21 which is also equipped with the arm M on which is the journal L that carries the head K.

Spaced from the head K is a head P, and to one end of the said head P is hingedly connected the outer end of the compressing arm 8, and detachably connected to the opposite end of the head P is the outer end of the releasing arm 9; it being understood in this connection that the inner end of the releasing arm 9 is hingedly connected to one end of the head K. At its end remote from the gear $n$ the shaft $m$ is provided with a crank arm 22 and pivotally connected to the said crank arm 22 is a rod 23, Figure 2, connected at its opposite end to an arm 24 on a rock shaft 25 which also carries an arm 26 pivotally connected at 27 to the head P. Fixedly connected to the head P is an arm 28, and between the outer end of said arm 28 and a lug 29 on the attachment frame is a link 30, the function of which is to assure the compressing arm 8 and the releasing arm 9 assuming positions in the same horizontal plane. By particular reference to Figure 11 it will be observed that a spring-pressed finger 31 is pivoted to the head P, and by comparing Figure 11 with Figure 2 it will be noted that the finger 31 is adapted to engage a bar 32 fixed to the attachment frame. Immediately before the arms 8 and 9 reach the position in the same horizontal plane, the finger 31 moves up against the bar 32 with the result that the latch 33 on the head P unlocks the spring actuated hook 34 from the pin 35 on the head P; it being understood in this connection that the hook 34 is pivoted on the releasing arm 9 and that the said arm 9 is notched at 36 to receive the pin 35. When the said disengagement of the hook 34 from the pin 35 is accomplished, the outer end of the releasing arm 9 will be left free to be drawn out of connection to the head P by means hereinafter described. On the return movement of the head P with the finger 31 it will be noted that the said finger 31 will swing and pass the bar 32. For the described disconnection of the releasing arm 9 from the head P I provide the organized mechanism best shown in Figures 1, 2, 3, 9, 10 and 15 of the drawings. For the sake of clearness I will first explicitly describe the said mechanism, and then set forth the association of the same and the manner in which it operates to perform the function intended. By comparison of the figures it will be noted that a sector gear $33^\times$ is pivoted at $34^\times$ on a bracket $35^\times$ carried by the attachment frame, and that the said sector is provided with a spoke 36 on which is a cam 37, and is also provided with a finger 38 on which is a pendent bill 39, Figure 4. Loose on the shaft $r$, Figures 9 and 10 is a gear 40, intermeshed with the teeth of the sector gear $33^\times$, and at the inner side of said gear 40 is a clutch face 41 to receive a key 42 on a clutch member 43 that is splined on the shaft $r$ and is backed by a spring 44, said spring 44 surrounding the shaft $r$ and being intermeshed between the inner end of the clutch 43 and a collar 45 that is fixed to the shaft $r$. The shaft $r$ extends through a standard 46 of the frame, and on the said standard is an arm 47 between which and the sector gear $33^\times$ is interposed a retractile spring 48 which has for its function to yieldingly retain the sector $33^\times$ in and return it to the position shown in Figure 9. By comparison of Figures 9 and 15 it will be noted that a sleeve 49 is fixed to the frame standard 46 and loosely receives the shaft $r$; also, that said sleeve 49 is flattened as indicated by 50. Slidable on the sleeve 49 and held against turning by the flat side 50 thereof is a yoke 51, connected by arms 52 with the clutch member 43, the direct connection of the arms 52 being to a collar 53 arranged in a circumferential groove in the clutch member. Fixed with respect to and carried by the yoke 51 is a latch 54 best shown in Figure 15. The end of this latch remote from the yoke 51 is beveled as indicated by 55 to enable it to readily ride over one arm of a keeper lever 56, said arm of the lever 56 being also beveled to facilitate the passage of the end of the latch 54 between it and the adjacent side of the sleeve 49. Between the other arm of the keeper lever 56 and the standard 46 is interposed a retractile spring 57. The mechanism referred to being constructed in the manner described it follows that when the compressing arm 8 and releasing arm 9 are swung into the same horizontal plane, the channel portion 60 of the releasing arm 9 will receive the pendent bill 39 of the finger 38 on the sector gear 33ˣ. Then it being remembered that at this time the outer end of the releasing arm 9 has been unlocked, it follows that the head K trips the keeper lever 56 and releases the latch 54 when by the action of the spring 44 the clutch 43 is engaged with the gear 40 so as to cause the latter to rotate with the shaft $r$. The rotation of the gear 40 will be attended by swinging of the sector 33ˣ in the direction indicated by the arrow in Figure 9 with the result that the releasing arm 9 will be swung outwardly by the finger 38 into the open position shown by dotted lines in Figure 3. On the said movement of the sector gear 33ˣ the cam 37 acts against the face 61 of the clutch 43 and by retracting the clutch renders the gear 40 loose on the shaft $r$, whereupon the spring 48 contracts and returns the sector gear 33ˣ to the position shown in Figure 9. The said return movement of the sector gear 33ˣ will manifestly be attended by movement of the releasing arm 9 to the closed position, and by the movement of the latch 54 into the position shown in Figure 15 relatively to the sleeve 49 and the keeper lever 56, for a following operation. After the return of the sector gear 33ˣ and the other parts to the positions just mentioned, the rod $b$ is again thrust downwardly to repeat the operation before described which has to do with resetting of the compressing arm 8 and the releasing arm 9 for the reception of the quota of bundles to form another shock.

By comparison of Figures 1 and 4, it will be noted that the shaft $r$ that is adjacent to the harvester binder is designed to be continuously rotated from any appropriate working part of the harvester binder through the medium of a sprocket belt 70 that is mounted upon and extends from the sprocket gear 7 splined on the shaft $r$ and through which the shaft $r$ is longitudinally adjustable as before described incident to the longitudinal adjustment of the shocker attachment in consonance with the before mentioned adjustment of the organized binding mechanism of the harvester binder.

By particular reference to Figures 1, 2 and 3 it will be noted that the releasing arm 9 is provided with a plurality of tangs 75, disposed at right angles thereto and that by the outer ends of the said tangs is carried a bar 76 in parallelism with the intermediate portion of the releasing arm 9 and adapted when the arms 8 and 9 are swung into the same horizontal plane to rest in rear of the shock with a view to preventing the shock tumbling over toward the rear as the attachment progresses forwardly.

In the foregoing connection it will be understood that after the shock is deposited on end on the ground as shown by dotted lines in Figure 4, the releasing arm 9 assumes the open position shown by dotted lines in Figure 3 so that said arm 9 offers no interference with the leaving of the shock on the ground as the harvester binder and the attachment move forwardly. It will also be understood that subsequently to the placing of the shock on ground and as the machine moves forwardly the arm 9 will pass the shock, and when the said arm 9 is clear of the shock, the arm 9 will be quickly moved to and locked in the closed position.

By particular reference to Figure 1 it will be noted that the rod 10ᵃ is guided in its movements by the arms 80, carried by the harvester binder.

Upon the delivery chute depositing the bundles one by one in the usual manner between the arms 8 and 9, the catch 15ᵃ is released, whereupon springs 45ᵉ and 46ᵉ force the parts 10ᵃ and 10ᵇ against the arm 8 so as to latch it to arm 9. During this movement the rod $b$ is forced downwardly together with swinging member 10 whereupon the lever $f$ is released through the medium of the trip $e$ to set the shaft $r$ in motion, thus causing the arms 8 and 9 to assume a horizontal position prior to being separated for the delivery of the bundles. When the shocker is moved past the shock, the arm 9 is returned to and fastened in the position shown in Figure 2 and the pinion $p$ is released. When the arms 8 and 9 have returned to vertical position the rod 10ᵃ with its hook end will engage the hook D of the arm 8, causing it to release its grip with arm 9 and return to open position where catch 15ᵃ retains it through the mechanism operated by shaft 13 and associated elements.

It will be apparent from the foregoing that notwithstanding its capacity of function and automatic operation my improvement is simple and inexpensive in construction and embodies no delicate parts such as are likely to get out of order after a short period of use.

I have entered into a detailed description of the construction and relative arrangement of the parts embraced in the present and preferred embodiment of my invention in order to impart a full, clear and exact understanding of the said embodiment. I do not desire, however, to be understood as confining myself to the said specific construction and relative arrangement of parts inasmuch as in the future practice of the invention various changes in the form, construction and relative arrangement of the elements may be made within the scope of my appended claims.

Having described my invention, what I claim and desire to secure by Letters-Patent, is:—

1. In a shocker attachment for harvester binders, the combination of a carrying frame, oscillatory heads thereon, means for oscillating said heads, a compressing arm, and a releasing arm pivoted to one head and detachably locked to the other head, means for depressing the inner portion of the compressing arm and means for opening and closing the releasing arm.

2. In a shocker attachment for harvester binders, the combination of a carrying frame, inner and outer oscillatory heads thereon, means for oscillating said heads, a releasing arm interposed between and connected to the heads, a compressing arm pivoted to the outer head and having its inner portion movable toward and from the inner head and detachably connected thereto, a vertically movable member for cooperation with said compressing arm, means for moving the releasing and compressing arms and a shock therein through a part of a circle, means for depressing the inner portion of the compressing arm, means for moving the vertically movable member downwardly and upwardly, means for latching the compressing arm on depression thereof, and means for restoring the parts to initial position after the discharge of a shock.

3. In a shocker attachment for harvester binders, the combination of a carrying frame, a vertically movable member, oscillatory heads on the carrying frame, means for oscillating said heads, a releasing arm carried by the heads and extending between the same, keeper means on the inner head, a compressing arm pivoted to the outer head and movable toward and from said keeper means, a rock shaft, and means complementary to said shaft for depressing the compressing arm and moving the said vertically movable member.

4. A shocker attachment for harvester binders, comprising a frame, a downwardly swinging member pivoted thereto, inner and outer oscillatory heads carried by the frame, means for oscillating said heads, a compressing arm hingedly connected to the outer head, cooperating means on the inner head and the compressing arm to detachably connect said arm to said head, reciprocatory means to depress the compressing arm and connect the same to and disconnect the same from the inner head, and means to depress and raise said swinging member.

5. A shocker attachment for harvester binders, comprising a frame, a downwardly swinging member pivoted thereto, inner and outer oscillatory heads carried by the frame, means for oscillating said heads, a compressing arm hingedly connected to the outer head, cooperating means on the inner head and the compressing arm to detachably connect said arm to said head, reciprocatory means to depress the compressing arm and connect the same to and disconnect the same from the inner head, means to depress and raise said swinging member, a releasing arm hingedly connected to the inner head, and detachably locked to the outer head, means to effect disconnection of the releasing arm from the outer head, and means to swing said releasing arm away from and toward closed position.

6. A shocker attachment for harvester binders, comprising a frame, a downwardly swinging member pivoted thereto, inner and outer oscillatory heads carried by the frame, means for oscillating said heads, a compressing arm hingedly connected to the outer head, cooperating means on the inner head and the compressing arm to detachably connect said arm to said head, reciprocatory means to depress the compressing arm and connect the same to and disconnect the same from the inner head, means to depress and raise said swinging member, a releasing arm hingedly connected to the inner head, and detachably locked to the outer head, means to effect disconnection of the releasing arm from the outer head, and means to swing said releasing arm away from and toward closed position; said means including a channeled portion on the releasing arm and a swinging element mounted on the frame and having a finger provided with a bill adapted to cooperate with said channeled portion.

7. The combination in shocker attachment for harvester binders, of a frame, oscillatory heads spaced apart and carried by said frame, means for oscillating said heads, a releasing arm hingedly connected to the inner head and detachably locked to the outer head, means to unlock the outer end of the releasing arm, and means to swing said arm away from and toward the closed position.

8. The combination in shocker attachment for harvester binders, of a frame, oscillatory heads spaced apart and carried by said frame, means for oscillating said heads, a releasing arm hingedly connected to the inner head and detachably locked to the outer head, means to unlock the outer end of the releasing arm, and means to swing said arm away from and toward the closed position; said means including a channeled portion on the arm, and a swinging element equipped to engage and cooperate with said channeled portion.

In testimony whereof I affix my signature.

NATHANIEL O. KNUTSON.